(12) United States Patent
Ahmed et al.

(10) Patent No.: US 12,353,566 B2
(45) Date of Patent: *Jul. 8, 2025

(54) CUSTOM PATCHING AUTOMATION WITH MACHINE LEARNING INTEGRATION

(71) Applicant: Bank of America Corporation, Charlotte, NC (US)

(72) Inventors: Syed Luqman Ahmed, New Delhi (IN); Adi Narayana Rao Garaga, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,009

(22) Filed: Apr. 30, 2024

(65) Prior Publication Data
US 2024/0281542 A1    Aug. 22, 2024

Related U.S. Application Data

(63) Continuation of application No. 18/139,455, filed on Apr. 26, 2023, now Pat. No. 12,008,114, which is a continuation of application No. 16/902,456, filed on Jun. 16, 2020, now Pat. No. 11,669,621.

(51) Int. Cl.
| | |
|---|---|
| *G08B 23/00* | (2006.01) |
| *G06F 8/65* | (2018.01) |
| *G06F 21/57* | (2013.01) |
| *G06N 5/04* | (2023.01) |
| *G06N 20/00* | (2019.01) |

(52) U.S. Cl.
CPC .............. *G06F 21/577* (2013.01); *G06F 8/65* (2013.01); *G06N 5/04* (2013.01); *G06N 20/00* (2019.01); *G06F 2221/034* (2013.01)

(58) Field of Classification Search
CPC ..................................................... G06F 21/577
USPC ......................................................... 726/25
See application file for complete search history.

(56) References Cited

U.S. PATENT DOCUMENTS

| | | | |
|---|---|---|---|
| 7,735,078 B1 | 6/2010 | Vaidya | |
| 9,122,558 B2* | 9/2015 | Ewington | ............... G06F 8/658 |
| 10,789,057 B2* | 9/2020 | Vichare | ..................... G06F 8/60 |

(Continued)

FOREIGN PATENT DOCUMENTS

JP    2008512983 A    4/2008

*Primary Examiner* — Evral E Bodden
(74) *Attorney, Agent, or Firm* — Banner & Witcoff, Ltd.

(57) ABSTRACT

A machine learning computing system identifies a vulnerability associated with a server. Based on information associated with the server and a knowledge base, the computing system schedules an interval for patching the server in a centralized tracking module. Based on the knowledge base and the vulnerability, the computing system creates, validates, and deploys the patch job. During patch job execution, the computing system monitors the status of the patch job at the server and transmits status updates to a user interface module. After expiration of the interval, the computing system generates an assessment report for the executed patch job. The computing system updates the knowledge base based on the assessment report to improve future decisioning processes. Based on the success or failure of the patch job, the computing system, upon a failure indication, automatically reschedules an interval for patching the server.

20 Claims, 5 Drawing Sheets

(56) References Cited

U.S. PATENT DOCUMENTS

| | | |
|---|---|---|
| 2003/0220992 A1 | 11/2003 | DiRico |
| 2004/0237068 A1 | 11/2004 | Ren |
| 2013/0263104 A1 | 10/2013 | Baset et al. |
| 2018/0131574 A1* | 5/2018 | Jacobs ................ H04L 43/0817 |
| 2019/0258478 A1 | 8/2019 | Islam et al. |
| 2020/0204468 A1 | 6/2020 | Nickolov et al. |

* cited by examiner

CUSTOM PATCHING AUTOMATION WITH MACHINE LEARNING INTEGRATION

CROSS REFERENCE TO RELATED APPLICATION(S)

This application is a continuation of U.S. patent application Ser. No. 18/139,455, now U.S. Pat. No. 12,008,114, entitled "Custom Patching Automation with Machine Learning Integration" filed Apr. 26, 2023 which is a continuation of and claims priority to U.S. patent application Ser. No. 16/902,456, now U.S. Pat. No. 11,669,621, entitled "Custom Patching Automation with Machine Learning Integration" filed on Jun. 16, 2020, both of which are incorporated by reference in their entirety.

BACKGROUND

Aspects of the disclosure relate to managing server patching processes within a computing system. One or more aspects of the disclosure relate to an intelligent patch management system capable of automatically executing, monitoring, and assessing server patching processes within a computing system.

Today, many enterprise organizations (e.g., business organizations, educational institutions, governmental entities, and the like) manage a variety distributed systems and applications that are associated with enterprise computing systems of each enterprise organization. These systems and applications are typically stored among clusters of servers distributed between a number of geographic data centers associated with the enterprise organization. These servers often require periodic maintenance to operate properly and, in some cases, require immediate maintenance to resolve unexpected issues that arise during operation. Server patching is a process that serves to maintain and update servers of a computing system through manual and automatic procedures. Because of the large number of servers and users associated with enterprise computing systems, server patching can be a time-consuming process that may introduce a degree of human error, leading to potential reputational loss for the enterprise organization, as well end user dissatisfaction with the systems and applications associated with server outages. A number of systems and services attempt to manage the processes associated with server patching, however, they lack centralized scheduling, coordination, and implementation mechanisms, as well as the ability to intelligently analyze and learn from previous server patching processes.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with coordinating and executing server patching processes.

In some cases, the patch management system may include a user interface module to configure one or more processes associated with server patching. The user interface module may be compatible with existing programs for receiving server patch requests, creating patch jobs, monitoring execution of server patch jobs, and/or generating patch job assessment reports. In some cases, the patch management system may include a machine learning module. The machine learning module may enable intelligent processes within the patch management system. In some cases, the machine learning module may analyze reserved maintenance windows associated with servers to automatically schedule server patches. For example, a server patch may be automatically scheduled by the patch management system based on the priority of the patch (e.g., the degree of the vulnerability/bug associated with the patch), the classification of server(s) affected by the patch (e.g., whether the patch affects a server associated with essential and/or critical system(s)), and/or the expected time necessary to complete the patch.

In some cases, the patch management system may analyze one or more of the distributed servers of the enterprise computing system to identify vulnerabilities (e.g., security flaws, system bugs, server errors, and the like). The machine learning module may analyze (e.g., continuously, periodically, intermittently, and the like) one or more of the distributed servers to validate system operation. In some cases, the patch management system may analyze historical data (e.g., assessment reports) associated with previous successful and/or unsuccessful server patches. Based on the analysis, the machine learning module may automatically predict and/or recommend server patches. In some cases, the patch management system may automatically assign responsibilities for predicted and/or recommended server patches to individuals (e.g., system administrators) of the enterprise computing system at the user interface module. The predicted and/or recommended server patches may be integrated with existing programs associated with server patching for automatic and/or manual implementation. In some cases, the patch management system may include a centralized tracking module. The centralized tracking module may consolidate the assessment reports and/or logs associated with server patching processes to track the patches to one or more servers distributed throughout the enterprise computing system (e.g., servers that were recently patched, servers scheduled to be patched, existing server vulnerabilities that need to be patched).

In some cases, the patch management system may automatically enable one or more processes associated with server patching (e.g., scheduling, notification, deployment, execution, assessment). For example, based on analysis of established maintenance windows for a cluster of distributed servers, the patch management system may automatically schedule the cluster of servers for patching within a specified time period of the associated reserved maintenance window and create the patch jobs for execution. In some cases, the patch management system may monitor the execution of patch jobs. While monitoring the execution of a patch job, the patch management system may transmit real-time monitoring updates (e.g., status of the patch, time remaining to complete the patch, identification of systems of the server that have been patched, known vulnerabilities that have been patched) to the user interface module. In some cases, after execution of a patch job, an assessment report associated with the patch job may be generated by the patch management system and/or another application. The patch management system may analyze the assessment report to validate the success of the patch job. In some cases, the patch management system may identify that execution of the patch job was incomplete and/or unsuccessful and automatically reschedule the elements of the patch job that were incomplete and/or unsuccessful. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
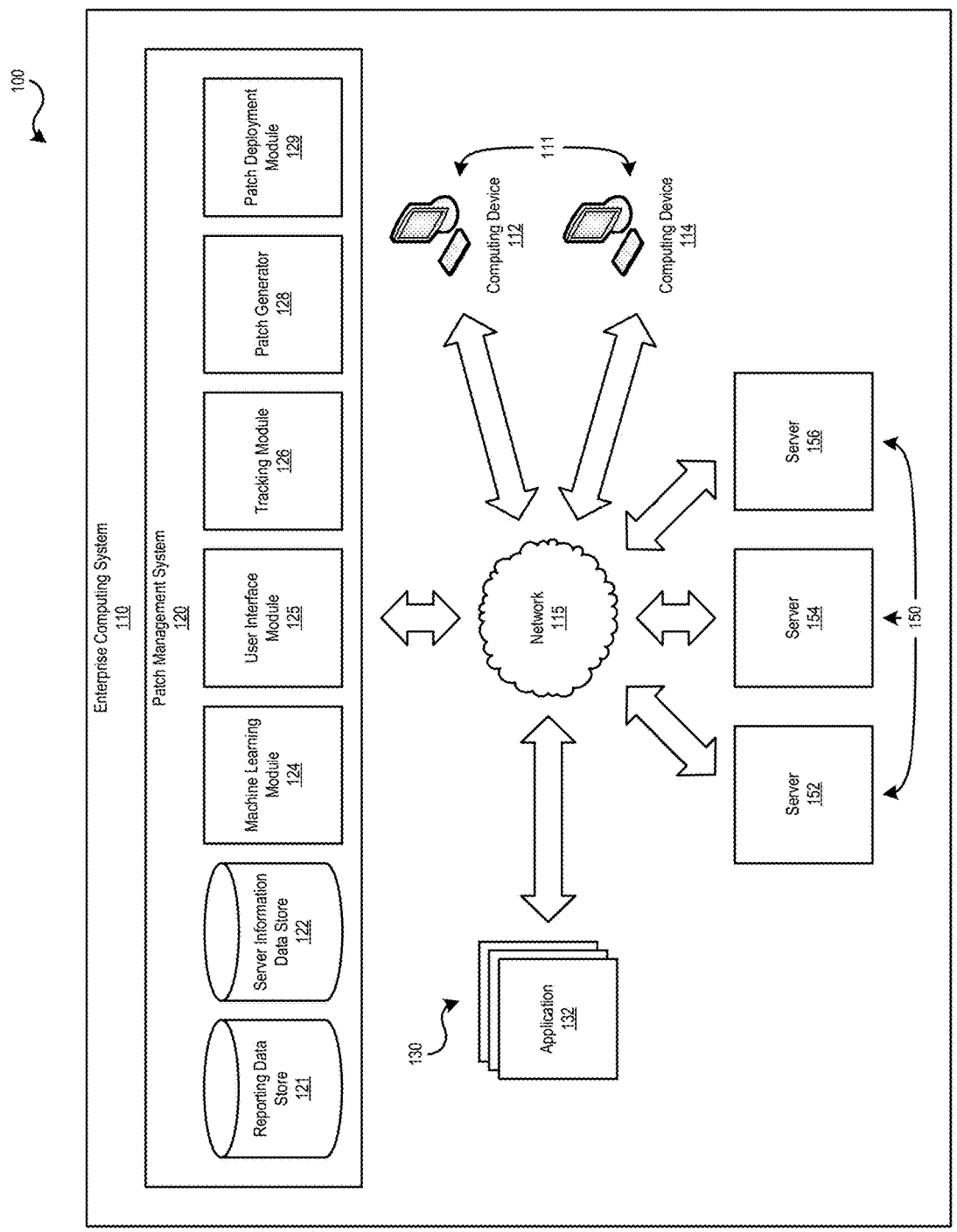
FIG. 1 depicts an illustrative computing environment for an intelligent patch management system capable of automatically coordinating, executing, monitoring, and assessing server patching processes in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

In some cases, patching servers associated with a variety of systems and geographic locations requires multiple applications and programs managed by system administrators of a variety of geographic locations. These applications and programs typically lack cohesion and centralized configuration mechanisms. Decentralized server tracking mechanisms may lead to the creation of multiple maintenance windows for patching servers, leading to infrastructure instability and possible system outages during high-use periods for end users. Existing applications and programs lack real time reporting capabilities during execution of patch jobs, as well as the ability to analyze existing server vulnerabilities and recommend associated patches. To remedy these deficiencies, an enterprise computing system may be equipped with an intelligent patch management system capable of automatically managing server patching processes for a number of servers distributed across an enterprise computing system using machine learning capabilities. As such, a need has been identified for an improved and robust system capable of intelligently managing server patching processes within a computing system. Aspects described herein are directed to developing a system for an intelligent patch management system that may integrate with existing applications and be used to automatically coordinate, execute, and assess server patching processes.

In some cases, an enterprise computing system may include one or more servers. The one or more servers may operate in a networked environment supporting connections to one or more remote computing devices. The one or more servers may be located in one or more geographic locations and may be associated with one or more applications and/or systems of the enterprise computing system. In some cases, the enterprise computing system may be equipped with an intelligent patch management system that is capable of managing the processes associated with patching servers distributed across a computing system (e.g., the enterprise computing system). The patch management system may include a user interface module accessible via one or more computing devices. In some cases, one or more individuals (e.g., system administrators) may configure, manage, and/or monitor server patching processes via the user interface module. The user interface module may integrate and/or interact with one or more applications associated with server patching processes (e.g., applications for receiving patch change requests, creating patch jobs, scheduling execution of patch jobs within maintenance windows, monitoring system vulnerabilities, deploying patch jobs for execution, and the like), allowing the patch management system to integrate applications from a number of facets of server patching processes in a centralized, accessible system.

In some cases, the patch management system may include one or more data stores that include data associated with server patching processes and the servers of the enterprise computing system. The patch management system may access, analyze, and supplement the data contained in these data stores to automatically and intelligently execute server patching processes. The data stores may include assessment reports associated with previous server patches may include log information related to the patch (e.g., an identifier for the server, an identifier for the vulnerability/bug associated with the patch, the date, the time, the duration of the patch, the business unit associated with the server), whether the patch was successful or unsuccessful, whether the patch was complete or incomplete, and the like. The assessment reports may be generated by the patch management system and/or another application (e.g., a reporting application). The data stores may include server information, such as identifiers for servers, server cluster information (e.g., the servers(s) located with a server, the server(s) associated with like systems), associated business unit information (e.g., the group(s) within the enterprise organization responsible for the server and/or the systems associated with the server), patch approval permissions, reserve maintenance windows (e.g., available scheduled outage periods to patch a server), and/or usage information for the server (e.g., when systems associated with the server are typically in use).

To enable intelligent capabilities and automatic decisioning, the patch management system may include a machine learning module. The machine learning module may include capabilities to automate one or more processes associated with server patching based on an intelligent knowledge base, while requesting manual intervention in cases outside the intelligent knowledge base. To supplement the intelligent knowledge base, the machine learning module may analyze the assessment reports associated with previously executed patch processes, identifying errors that lead to unsuccessful and incomplete patch jobs, while identifying successful situations where server patch process may be further expedited. For example, an executed patch job directed at a cluster of servers associated with a system may be incomplete if the configured duration of the maintenance window for the patch was too short. The machine learning module may identify that the patch job requires a longer period of time to complete and incorporate the identified knowledge in future scheduling decisions associated with the corresponding servers and/or the patch job.

In some cases, the machine learning module may analyze the systems associated with the server(s) of the enterprise computing system to automatically identify vulnerabilities (e.g., security flaws, system bugs, and the like). Analysis of the systems by the patch management system may occur periodically (e.g., every hour, every 12 hours, every 24 hours) and/or on command from a received input at the user interface module of the patch management system. The machine learning module may flag identified vulnerabilities and display the flagged vulnerabilities at the user interface module. Based on identifying vulnerabilities, the machine learning module may automatically recommend and/or trigger an application to generate one or more patch jobs for the server(s) associated with the one or more identified vulnerabilities.

The patch management system may include a centralized module to schedule and coordinate server patching processes (e.g., a tracking module). Applications associated with scheduling and/or coordinating server patching processes may integrate and/or interface with the tracking module. For example, the tracking module may integrate with an application that sources change requests to coordinate patches to systems and applications within the enterprise computing system. The tracking module may include the ability to identify and sort the servers of the enterprise computing system based on a number of factors, such as the server location (e.g., time zone), the business unit associated with the server, patch scheduling information for the server, and the applications/systems associated with the server.

In some cases, the patch management system may automatically manage patch scheduling processes within the tracking module. The machine learning module may enable automatic patch scheduling by analyzing the reserved maintenance window (e.g., the scheduled period of time to perform updates for software associated with the server) for a server and the usage characteristics (e.g., location of the server, classification of the server's operations, high use periods for the server) for the server and the associated systems. Automatic scheduling by the machine learning module may include an awareness of scheduled patches in the tracking module, preventing overlap between scheduled patches for a server and/or group of servers. Automatic patch scheduling may occur based on the priority of a patch (e.g., the urgency to implement the patch).

In some cases, the patch management system may automatically assign responsibilities for server patching processes to one or more individuals (e.g., system administrators) of the enterprise computing system. The machine learning module may automatically assign responsibilities by analyzing the business unit and/or systems associated with a system administrator and assign patch responsibilities that correspond to their responsibility within the enterprise organization. A system administrator may input their associated business unit (e.g., department, technology unit, and the like) with information for systems and/or applications for which they are responsible at the user interface module of the patch management system. In some cases, the patch management system may retrieve such information from existing data stores and/or applications within the enterprise computing system. The knowledge base of the machine learning module may be supplemented with patch responsibility information for future decision-making and/or assignment processes.

In some cases, the patch management system may automate processes associated with executing a patch (e.g., creating a patch job, notifying users of affected systems/applications of server outages) by integrating and/or interacting with one or more applications associated with creating and/or deploying a patch job. The machine learning module may automatically trigger a patch generator to create a patch job for an identified vulnerability, where the patch generator may be included in patch management system and/or be included as an application in the enterprise computing system. After a patch job is created by the patch generator and prepared for deployment/execution by a patch deployment module, the patch management system may automatically validate the scheduling information for the patch (e.g., the time, the date, the duration) in view of the reserved maintenance window and/or an exception list (e.g. a list of servers and/or systems exempt from patch sequences). For example, the machine learning module may validate the schedule information for the patch in view of the time zone of the users who make use of the systems and/or applications associated with the server. The machine learning module may analyze the contents and sequencing of the patch job to validate that the patch does not affect any unintended and/or critical systems.

In some cases, after a patch job is deployed by the patch deployment module the patch management system may monitor the status of the patch job via the tracking module, sending real-time monitoring updates (e.g., remediated vulnerabilities, execution errors, changes to the execution sequence) to the user interface module. Based completion of the patch job and/or expiration of the scheduled time interval, the patch management system and/or another application may generate an assessment report for the executed patch job. The assessment report may include log information for the patch job and an assessment of the patch job (e.g., success, failure, complete, incomplete). The assessment report may be stored in a reporting data store and/or add the assessment report to the knowledge base of the machine learning module for further analysis. Based on the contents of the assessment report, the machine learning module may flag the patch job and generate a notification at the user interface module for the flagged patch job. In some cases, if the patch job was incomplete, the machine learning module may automatically reschedule the associated server(s) for future patching with the elements of the patch job that were incomplete and/or unsuccessful. Additionally or alternatively, if the patch job was unsuccessful, the machine learning module may recommend modification to the patch job at the user interface module.

FIG. 1 depicts an illustrative computing environment 100 for an intelligent patch management system 120 capable of automatically coordinating, executing, monitoring, and assessing server patching processes in accordance with one or more aspects described herein. In some cases, the illustrative computing environment 100 may include an enterprise computing system 110 that may be operated by an enterprise organization (e.g., a business organization, an educational institution, a governmental entity, and the like). The enterprise computing system 110 may include one or more networks 115 (e.g., a telecommunications network, the Internet, a Wi-Fi network, and the like). In some cases, the network 115 may be a wired or wireless network, such as the networks described below with respect to FIG. In some cases, the illustrative computing environment 100 may include one or more computing devices 111 (e.g., computing device 112, computing device 114). The one or more computing devices 111 may be one of a mobile device, a tablet, a laptop computer, a desktop computer and/or the like. The one or more computing devices 111 may be communicatively coupled to the one or more networks 115 of the enterprise computing system 110. In some cases, the one or more computing devices 111 may be accessed and/or operated by individuals (e.g., system administrators) associated with the enterprise computing system 110 to manage, coordinate, and/or analyze server patching processes.

In some cases, the one or more computing devices 111 may access and/or interact with elements of the enterprise computing system 110 via the network 115. In some cases, the enterprise computing system 110 may include one or more applications 130. The one or more applications 130 may include email client platforms, internet browsers, business productivity applications (e.g., a word processing application, a spreadsheet application, a presentation application, a file management system application and the like), proprietary enterprise applications, and the like. Such applications 130 may be used to provide computer-aided functionality through use of applications and/or services, such as user accessed functionality (e.g., word processing, and the like), user services (e.g., email services, messaging services, software development services, and the like), web-based services to end users (e.g., customer accessed computing services) and/or system services (e.g., malware protection services, security management services, and the like). Additionally, or alternatively, the one or more applications 130 may include applications associated with the patching processes, including patch job creation tools (e.g., a patch generator), patch job deployment tools (e.g., a patch deployment module), patch job monitoring tools, endpoint security applications, change request management tools, vulnerability scanning applications, and the like.

In some cases, the enterprise computing system 110 may include one or more servers 150 (e.g., server 152, server 154, server 156). The one or more servers 150 may be communicatively coupled to one or more networks (e.g., network 115). The one or more servers 150 may store the one or more applications 130, programs, and/or systems of the enterprise computing system 110. The one or more servers 150 may operate in a networked environment supporting connections to the one or more computing devices 111 within the enterprise computing system 110. In some cases, the one or more servers 150 may be distributed among a number of different geographic locations (e.g., data centers) and/or business units associated with the enterprise organization. The one or more servers 150 and the associated systems (e.g., an application 132) may be patched, updated, and/or modified as described herein.

In some cases, the enterprise computing system may include an intelligent patch management system 120. The patch management system 120 may coordinate, schedule, execute, and assess patching processes for the one or more servers 150 distributed within the enterprise computing system 110. The patch management system 120 may integrate and/or interface with one or more existing applications 130 associated with server patching processes. The one or more computing devices 111 may access and/or configure the patch management system 120 as described herein via a user interface module 125.

In some cases, the patch management system 120 may include a user interface module 125. The user interface module 125 may generate one or more graphical user interface screens for display at the one or more computing devices 111 of the enterprise computing system 110. In some cases, one or more system administrators may configure and/or monitor server patching processes via the user interface module 125, where the user interface module 125 is accessed by the one or more computing devices 111 via the one or more networks 115. The user interface module 125 may integrate and/or interact with one or more applications 130 associated with server patching and/or management (e.g., applications for receiving patch requests, creating patch jobs, scheduling execution of patch jobs within maintenance windows, monitoring system vulnerabilities). For example, the user interface module 125 of the patch management system 120 may integrate with an endpoint security application (e.g., application 132) that identifies server security vulnerabilities in real-time, allowing a system administrator to access the information of the endpoint security application (e.g., application 132) within a graphical user interface screen generated by the user interface module 125. The user interface module 125 may integrate with one or more applications 130 for generating patch jobs and/or deploying patch jobs for execution at one or more servers 150 distributed within the enterprise computing system 110. Additionally or alternatively, for example, the user interface module 125 may integrate with systems for managing change requests (e.g., requests to modify software associated with a server) associated with server patching processes.

In some cases, the patch management system 120 may include one or more data stores (e.g., reporting data store 121, server information data store 122). In some cases, the reporting data store 121 may contain assessment reports associated with previously executed patch processes, where an assessment report is generated for after execution of a patch job to describe the patch job. The assessment reports may include information related to the server (e.g., an identifier for the server, the date, the time, the duration of the patch, a cluster of servers associated with the server), success of the patch job, completion of the patch job, and the like. The assessment reports may be generated by the patch management system 120 and/or an application 132. The assessment reports may be made available at the user interface module 125 and accessible by one or more elements of the patch management system 120 (e.g., a machine learning module 124, a tracking module 126). In some cases, the reporting data store 121 may contain reports identifying vulnerabilities and/or system bugs in one or more servers 150. The patch management system 120 and/or an application 132 may analyze the servers 150 of the enterprise computing system 110 to identify open vulnerabilities and/or system bugs.

In some cases, the server information data store 122 may include information identifying the servers 150 of the enterprise computing system 110. The server information data store 122 may include a database to store information including identifiers for a server (e.g., a numerical identifier), server cluster information (e.g., the servers(s) located with a server, the server(s) associated with like systems), associated business unit information (e.g., the group(s) within the enterprise organization responsible for the server and/or the systems associated with the server), patch approval permissions, reserve maintenance windows (e.g., scheduled outage periods to patch a server), and/or usage information for the server (e.g., when systems associated with the server are typically in use). The information contained in the server information data store 122 may be made available at the user interface module 125 and accessible by one or more elements of the patch management system 120 (e.g., a machine learning module 124, a tracking module 126). In some cases, information from the assessment reports of the reporting data store 121 may be added to the server information data store 122 to maintain accurate server information as described herein.

In some cases, the patch management system 120 may include a machine learning module 124. The machine learning module 124 may enable intelligent decision-making capabilities related to patch scheduling, assignment, execution, and/or assessment within the patch management system 120. The machine learning module 124 may utilize supervised decisioning algorithms (e.g., regression, decision tree, neural networks, and the like), unsupervised decisioning algorithms (e.g., Apriori algorithms, K-means, and the like), and/or reinforcement decisioning techniques (e.g., Markov decision processes). The machine learning module 124 may include capabilities to automate one or more processes associated with server patching based on an intelligent knowledge base. The knowledge base of the machine learning module 124 may include information sourced from one or more data stores (e.g., the reporting data store 121, the server information data store 122) of the enterprise computing system 110. In some cases, the machine learning module 124 may analyze, based on a supervised decisioning algorithm, an unsupervised decisioning algorithm, a reinforcement decisioning algorithm, and the like, the one or more assessment reports associated with previously executed patch jobs stored in the reporting data store 121. Information from the one or more assessment reports may be added to the knowledge base of the machine learning module 124.

In some cases, the machine learning module 124 may analyze assessment reports associated with one or more successful, completed patch jobs, as well as one or more incomplete and/or unsuccessful patch jobs. Based on the analysis, the machine learning module 124 may discover error(s) that may be associated with an unsuccessful and/or incomplete patch job, predict a fix for the error(s), and add the associated information of the problems and/or solutions to the knowledge base. In some cases, based on the analysis of the assessment reports, the machine learning module 124 may generate a patch job configuration file associated with a patch job for a vulnerability. The patch job configuration file may be communicated and/or otherwise made available for a patch generator 128. The machine learning module 124 may remediate the error in future patch processes for the corresponding server (e.g., server 152) and/or system. For example, an executed patch job directed at a server 152, or cluster of servers, associated with a financial application (e.g., application 132) may be incomplete if the configured duration of the maintenance window for the patch was too short. The machine learning module 124 may identify that the patch job requires a longer period of time to complete and incorporate this information to the knowledge base for future scheduling decisions for the corresponding servers 150 and/or the patch.

In some cases, the patch management system 120 may include a centralized module to schedule and coordinate server patching processes (e.g., a tracking module 126). The centralized tracking module 126 may be accessible to individuals (e.g., system administrators) of different business units, departments, and the like to maintain a uniform system to track planned, scheduled, and executed server patches. One or more applications 130 associated with scheduling and/or coordinating server patching processes may integrate and/or interface with the tracking module 126. For example, the tracking module 126 may integrate with an application (e.g., application 132) sourcing change requests to patch systems and applications (e.g., applications 130) within the enterprise computing system 110. The tracking module 126 may identify servers (e.g., the servers 150) within the enterprise computing system 110 that are scheduled for patching based on the server location (e.g., time zone), the business unit associated with the server, and/or the systems associated with the server. For example, an individual may access the information associated with the tracking module 126 at the user interface module 125 using a computing device 112. At the user interface module 125, the individual may determine if servers associated with a mobile banking application (e.g., application 132) are scheduled for patching and/or have been previously patched within a certain time period.

In some cases, based on receiving a change request and/or identifying a server vulnerability/bug, the patch management system 120 may be configured to automatically schedule a server for patching in the tracking module 126. When a server is scheduled for patching, the server may experience an outage period, where the server and the associated systems and/or applications (e.g., applications 130) are brought offline and/or otherwise made unavailable. To schedule a patch for a server (e.g., server 152), the machine learning module 124 may analyze the reserved maintenance window (e.g., the scheduled period of time to perform updates for software associated with the server) for the server 152 and usage characteristics (e.g., location of the server, classification of the server's operations, high use periods for the server) for the server 152. The machine learning module 124 may analyze scheduled patches in the tracking module 126 and validate scheduling to prevent overlap between scheduled patches for a server (e.g., server 152) and/or a cluster of servers. If the timing associated with scheduling a patch overlaps with an existing scheduled patch for the same server (e.g., server 152), the machine learning module 124 may automatically reschedule one of the patches. A specific patch may take priority over another patch based on analysis by the machine learning module 124.

In some cases, the patch management system 120 may automatically assign responsibilities for server patching processes to one or more individuals (e.g., system administrators) of the enterprise computing system 110. Additionally or alternatively, in some cases, one or more individuals (e.g., system administrators) may manually assign one or more responsibilities (e.g., patch coordination, patch deployment) for server patching processes within the patch management system 120. The machine learning module 124 may analyze information identifying the business unit, employment title, and the like associated with an individual and/or information corresponding to computing systems associated with the individual and may assign patch responsibilities based on that analysis, such as assigning patch responsibilities that correspond to the individual's position and/or the individual's computing permissions within the enterprise organization. An individual may input their associated business unit (e.g., department, technology unit, and the like) with a list of systems and/or applications (e.g., applications 130) for which they are responsible at the user interface module 125 of the patch management system 120. In some cases, the patch management system 120 may retrieve responsibility information (e.g., information indicating server patching responsibilities) for an individual from existing data stores within the enterprise computing system 110. In some cases, responsibility information may be determined for an individual by the patch management system 120 based on the analysis of the information associated with the individual, as discussed above. In some cases, such responsibility information associated with one or more individuals (e.g., system administrators) of the enterprise computing system 110 may be manually configured the user interface module 125 and/or other applications 130. The responsibility information corresponding to an individual may be added to the knowledge base of the machine learning module 124 for future decision-making and assignment processes.

In some cases, after a patch for a server (e.g., server 152) has been scheduled, the patch management system 120 may automate one or more processes associated with executing the patch (e.g., creating a patch job, notifying users of affected systems/applications of server outages). The patch management system 120 may integrate and/or interact with one or more applications (e.g., applications 130) associated with creating and/or deploying a patch job. In some cases, the enterprise computing system 110 may include a patch generator 128 that is responsible for creating one or more patch jobs. The patch generator 128 may be included in the patch management system 120 and/or be a separate application (e.g., application 132) of the enterprise computing system 110. In some cases, the machine learning module 124 may automatically generate and/or trigger the patch generator 128 to create a patch job for an identified vulnerability, where the vulnerability is scheduled for patching based on an identifier associated with the vulnerability (e.g., a quality identifier (ID)).

After a patch job is created and scheduled for execution, the patch management system 120 and/or machine learning module 124 may automatically validate the scheduling information for the patch (e.g., the time, the date, the duration) in view of the reserved maintenance window and/or an exception list (e.g. a list of servers and/or systems exempt from patching). For example, the machine learning module 124 may validate the schedule information for the patch in view of the time zone(s) of the users who interact with the systems and/or applications (e.g., applications 130) associated with the server. In some cases, the machine learning module 124 may validate the sequencing (e.g., ordering of execution) of the patch. For example, a specific patch may require that sub-processes of the patch occur in a specific sequence. The machine learning module 124 may analyze the sequence of the patch to validate the sub-processes are in the correct order. The machine learning module 124 may analyze the affected servers (e.g., servers 150) of the patch job to validate that the patch does not inadvertently affect any unintended and/or critical systems of the enterprise computing system 110. In some cases, a patch job for a server (e.g., server 152) associated with a critical system may undergo more than one validation process. In some cases, the validation process may ensure that the server and/or the system associated with the server are not included in the exception list, preventing unintended server outages. Validation processes may be continuously initiated and/or executed by the machine learning module 124.

In some cases, a patch deployment module 129 may deploy one or more patch jobs for execution at the one or more servers 150. The patch deployment module 129 may be included in the patch management system 120 and/or be a separate application (e.g., application 132) of the enterprise computing system 110. In some cases, once a patch job is deployed for execution by the patch deployment module 129, the patch management system 120, machine learning module 124, tracking module 126, and/or other applications (e.g., applications 130) may monitor the status of the patch job. The patch management system 120 may monitor the status of the patch job and transmit real-time updates (e.g., remediated vulnerabilities, execution errors, changes to the execution sequence) to the user interface module 125 of the patch management system 120. In some cases, the real-time updates may be transmitted and stored at the reporting data store 121. A system administrator may view real-time reporting information via the user interface module 125. At the user interface module 125, if an error and/or unexpected outcome occurs during patch job execution, an individual may intervene to manually terminate the patch job. Upon completion of execution of the patch job, the patch management system 120 and/or another application (e.g., application 132) may generate an assessment report for the executed patch job. The assessment report may be stored within one or more data stores (e.g., the reporting data store 121) of the patch management system 120 and be made accessible by the patch management system 120 and/or via the user interface module 125 for further analysis by an individual (e.g., a system administrator). The assessment report may include log information for the patch job and an assessment of the patch job (e.g., success, failure, complete, incomplete).

In some cases, the patch management system 120 may add the generated assessment report to the knowledge base of the machine learning module 124. The machine learning module 124 may analyze the assessment report and incorporate the information for future decision making associated with server patching processes as described herein. If the patch job was unsuccessful and/or incomplete, the machine learning module 124 may flag the patch job and generate a notification at the user interface module 125 for the flagged patch job. In some cases, if the patch job was incomplete, the machine learning module 124 may automatically reschedule the associated server(s) 150 for future patching. The rescheduled patch job may include the elements of the patch job that were incomplete and/or unsuccessful in the previously executed patch job. Additionally or alternatively, if the patch job was unsuccessful, the machine learning module 124 may recommend modifying the patch job to remedy the cause of the error during patch job execution (e.g., an order of execution of patches of interconnected systems and/or applications). In some cases, the machine learning module 124 may automatically modify the patch job to remedy the cause of the error during the patch job.

Figure 2A:
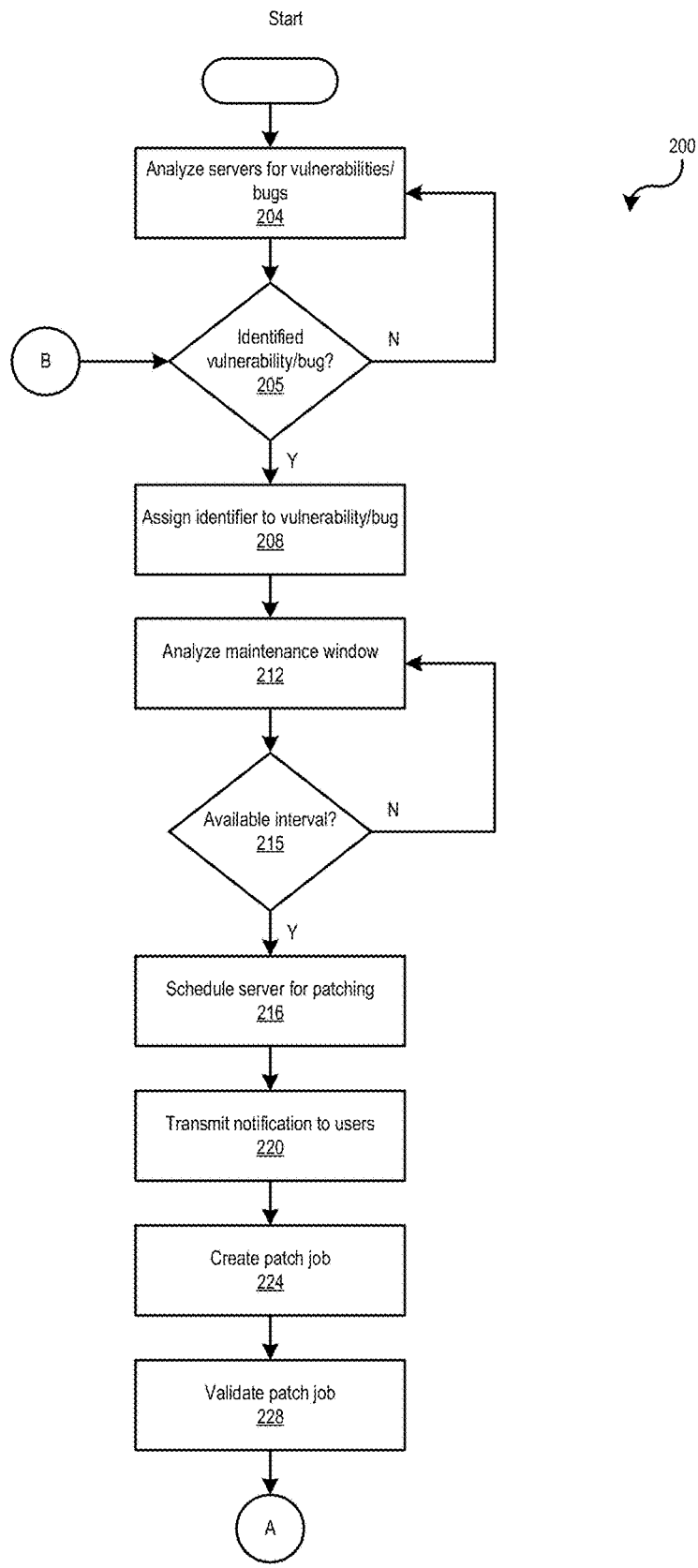
FIG. 2A shows an illustrative event sequence for automatic server patching in accordance with one or more aspects described herein.

FIG. 2A shows an illustrative event sequence 200 for automatic server patching in accordance with one or more aspects described herein. The events shown in the illustrative event sequence 200 are illustrative and additional events may be added, or events may be omitted, without departing from the scope of the disclosure. At 204, the patch management system 120 may scan the one or more servers 150 of the enterprise computing system 110 for vulnerabilities in systems and/or applications (e.g., applications 130) associated with the one or more servers 150. The machine learning module 124 may analyze the one or more servers 150 to identify server vulnerabilities using the information (e.g., assessment reports of previously executed patch jobs, known server vulnerabilities, error reports, release notes for application (e.g., application 132) or system updates, and the like) contained in the knowledge base of the machine learning module 124 and information gathered from one or more additional applications 130 (e.g., an endpoint security analysis application) of the enterprise computing system 110. The one or more servers 150 may be scanned for vulnerabilities continuously, periodically (e.g., every hour, 12 hours, 24 hours), and/or or on command from a received input via the user interface module 125. Additionally or alternatively, an individual associated with the enterprise computing system 110 (e.g., a system administrator) may manually analyze the one or more servers 150 and/or report an identified vulnerability at 204.

If a server vulnerability is not identified at 205, the patch management system 120 and/or an individual (e.g., a system administrator) may continue to analyze the one or more servers 150 for vulnerabilities at 204 as described herein. If a server vulnerability is identified at 205, the patch management system 120 may assign an identifier to the identified vulnerability at 208. The identifier may be a unique identifier (e.g., a quality ID) for the identified vulnerability. The identified vulnerability and the associated identifier may be stored in the reporting data store 121, the server information data store 122, and/or in the knowledge base of the machine learning module 124. In some cases, the identified vulnerability and the identifier may be added to the tracking module 126 for tracking a patch associated with the vulnerability. After an identifier is assigned for the vulnerability at 208, the machine learning module 124 may access the server information data store 122 to analyze the reserved maintenance window for the server (e.g., server 152) associated with the identified vulnerability at 212. In some cases, additional servers (e.g., server 154, server 156) may be associated with the vulnerability identified at 205. The machine learning module 124 may analyze the reserve maintenance window associated with the server (e.g., server 152) at 212. Analysis of the reserved maintenance window may allow the machine learning module 124 to determine a time interval to schedule the server (e.g., server 152) for the patching. In some cases, the machine learning module 124 may analyze additional information (e.g., high usage time intervals, geographic locations of the users associated with the server, additional systems associated with the server) for the server (e.g., server 152) and/or the systems associated with the server. For example, if the available reserved maintenance window associated with a server (e.g., server 152) is 1:00 AM to 4:00 AM Eastern Standard Time (EST) and usage data for the system associated with the server shows that a higher number of end users typically access the system from 1:00 AM-2:00 AM EST than from 3:00 AM-4:00 AM EST, the machine learning module 124 may avoid scheduling the server for patching from 1:00 AM-2:00 AM EST and instead schedule the server for patching from 3:00 AM-4:00 AM EST. The machine learning module 124 may access and analyze scheduling information associated with the server (e.g., server 152) in the tracking module 126 at 212 to determine if the server (e.g., server 152) is already scheduled for an alternate patch (e.g., an alternate vulnerability associated with the server is scheduled for patching.

At 215, based on the analysis at 212, the machine learning module 124 may determine if there exists an interval of time in the reserved maintenance window to schedule the server (e.g., server 152) for patching associated with the identified vulnerability. If an interval within the reserved maintenance window is not available at 215, the machine learning module 124 may proceed to further analyze the reserved maintenance window at 212 for an alternate interval to schedule the server (e.g., server 152) for patching at 212. For example, the machine learning module 124 may be configured to schedule a patch job for a vulnerability within 48 hours of identifying the vulnerability at 205. If an interval is not available within the configured 48-hour period, the machine learning module 124 may proceed to analyze the maintenance window associated with the server beyond the 48-hour period to later scheduled the server (e.g., server 152) for patching. If an interval within the reserved maintenance window is available at 215, the machine learning module 124 may schedule the server (e.g., server 152) for patching within the tracking module 126 at a determined interval within the reserve maintenance window at 216. The machine learning module 124 may be configured to prioritize patching a vulnerability within configured timing parameters (e.g., 24 hours, 72 hours) and/or the parameters for scheduling server patching processes as described herein. After scheduling the server for patching in the tracking module 126 at 216, the machine learning module 124 may transmit and/or trigger an application (e.g., application 132) to transmit a notification (e.g., an email message) to individuals (e.g., end users) associated with the server (e.g., server 152) that is scheduled for patching at 220. The notification may include information including the time of the patch, the duration of the patch, the affected systems and/or applications of the patch, and/or an outage period for the server. The outage period for the server may be triggered by the patch management system 120 and/or by one or more applications 130 to allow for the deployment and execution of a patch job. The machine learning module 124 may determine the associated individual(s) to notify based on analysis of information for the server (e.g., server 152) contained in the server information data store 122. In some cases, the machine learning module 124 may transmit a notification to system administrators associated with the server (e.g., server 152) at 220.

After transmitting a notification including information associated with the patch for the identified vulnerability at 220, the machine learning module 124 may generate and/or trigger the patch generator 128 to create a patch job for the identified vulnerability at 224. The patch job may include an update to the software associated with the server (e.g., server 152) and/or systems of the server that is designed to remedy the identified vulnerability. After creation of the patch job at 224, the machine learning module 124 may analyze and/or validate the patch job. Validation of the patch job may include verifying that the patch does not inadvertently affect any unintended and/or critical systems of the enterprise computing system 110. The machine learning module 124 may also validate scheduling for the patch job at 228 to verify that the server (e.g., server 152) associated with the patch is not scheduled for simultaneous patch jobs over a duration of time. In cases involving patch jobs to servers classified as critical and/or essential in the server information data store 122, the machine learning module 124 may perform multiple validations of the patch job for inadvertent effects.

Figure 2B:
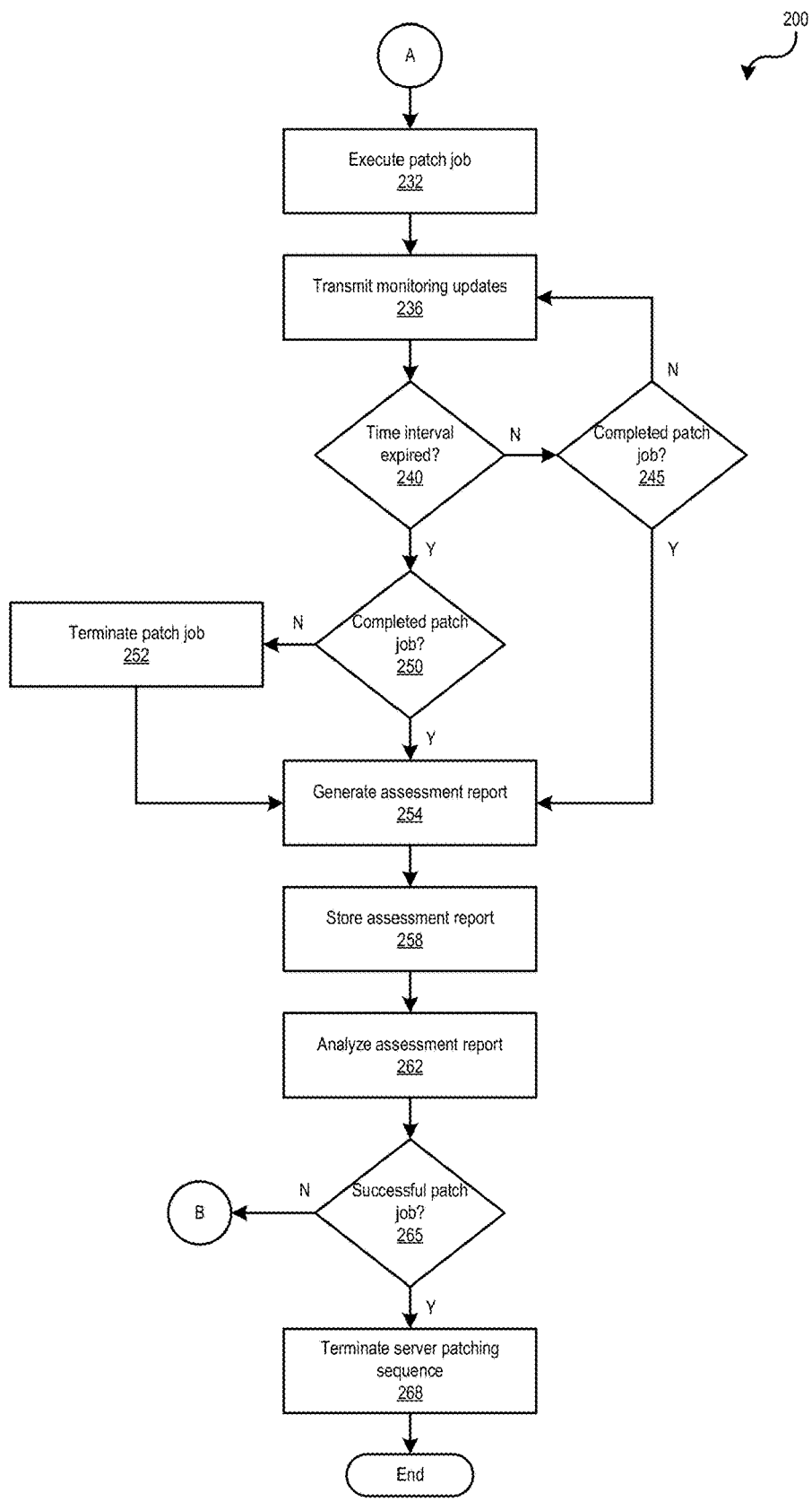
FIG. 2B shows an illustrative event sequence for automatic server patching in accordance with one or more aspects described herein.

FIG. 2B shows an illustrative event sequence 200 for automatic server patching in accordance with one or more aspects described herein. The events shown in the illustrative event sequence 200 are illustrative and additional events may be added, or events may be omitted, without departing from the scope of the disclosure. Continuing from FIG. 2A, at 232, the machine learning module 124 of the patch management system 120 may trigger the patch deployment module 129 to deploy and execute and/or trigger an application (e.g., application 132) to deploy and execute the patch job to remedy the identified vulnerability of the server (e.g., server 152). During execution of the patch job, the machine learning module 124, the tracking module 126, and/or another application (e.g., application 132) may monitor the status of the patch job and transmit monitoring updates to the user interface module 125 at 236. The monitoring updates may be accessible at the user interface module 125 displayed at a computing device (e.g., computing device 112) accessible via the network 115. The tracking module 126 may transmit monitoring updates in real-time while the patch job is under execution. The monitoring updates may include information related to vulnerabilities that have been remedied during the patch job, execution errors, failed patch implementations, time to completion, and/or changes to the patch execution sequence.

At 240, the tracking module 126 may determine whether the scheduled time interval for the patch job has expired. If the time interval has not expired at 240, the tracking module 126 may identify whether the patch job has completed at 245. If the patch job is determined to not be completed at 245, the tracking module 126 may continue to monitor the status of the patch job and transmit monitoring updates to the user interface module 125 at 236 as described herein. If the patch job is determined to be completed at 245, the tracking module 126 and/or another application 132 may generate an assessment report associated with the patch job at 254. The assessment report may include information related to the patched server (e.g., the identifier for the server, the date, the time, the duration of the patch, a cluster of servers associated with the server), success of the patch job, completion of the patch job, and the like. If the time interval has expired at 240, the tracking module 126 may identify whether the patch job has completed at 250. If the patch job is determined to be completed at 250, the tracking module 126 and/or another application 132 may generate an assessment report associated with the patch job at 254. If the patch job is determined to not be completed at 250, the tracking module 126 may trigger the machine learning module and/or another application (e.g., application 132) associated with execution of the patch job to terminate the patch job at 252, resulting in an incomplete patch job. After the patch job is terminated at 252, the tracking module 126 and/or another application 132 may generate an assessment report associated with the patch job at 254.

After the assessment report is generated at 254, the generated assessment report for the patch job may be stored in the reporting data store 121 of the patch management system 120 at 258. In some cases, at 258, the assessment report may be added to the knowledge base of the machine learning module 124 for further analysis. After storing the assessment report at 258, the machine learning module 124 may analyze the assessment report to evaluate the success of the executed patch job associated with the server (e.g., server 152). In some cases, the machine learning module 124 may analyze the assessment report at 262 and add the analyzed information to the knowledge base to improve future decision-making processes. For example, the machine learning module 124 may analyze the assessment report and identify an error in the deployed patch job that prevented implementation of an element of the patch job. The machine learning module 124 may recognize the source of the error and add the source of the error to the knowledge base, preventing the subsequently created patch jobs from including the source of the error. Additionally, for example, the machine learning module 124 may analyze the assessment report and identify the patch job completed in a time period significantly shorter than the scheduled time interval. Accordingly, the machine learning module 124 may identify that the time interval may be shortened in future associated patch jobs and may add the information to the knowledge base, allowing for reduced outage periods for affected servers 150.

After analyzing the assessment report at 262, the machine learning module 124 may determine if the executed patch job was successful at 265. If the executed patch job is determined to be unsuccessful at 265, the machine learning module 124 may analyze the maintenance window at 212 as described herein to reschedule the server for patching. A patch job may be determined to be unsuccessful if the vulnerability for the server associated with the patch job was not remedied during implementation of the patch job. If the executed patch job is determined to be successful at 265, the machine learning module 124 and/or patch management system 120 may terminate the illustrative event sequence 200 as described herein at 268. The illustrative event sequence 200 described herein for FIG. 2A and FIG. 2B may be applied to one or more vulnerabilities (e.g., multiple vulnerabilities were identified for a server during server analysis at 204) for an individual patch job and/or one or more servers 150 for an individual patch job (e.g., a vulnerability identified during server analysis at 204 is applicable to multiple servers). In some cases, one or more steps of the illustrative event sequence 200 described herein for FIG. 2A and FIG. 2B may be performed manually by one or more individuals (e.g., system administrators) associated with the enterprise computing system 110.

Figure 3:
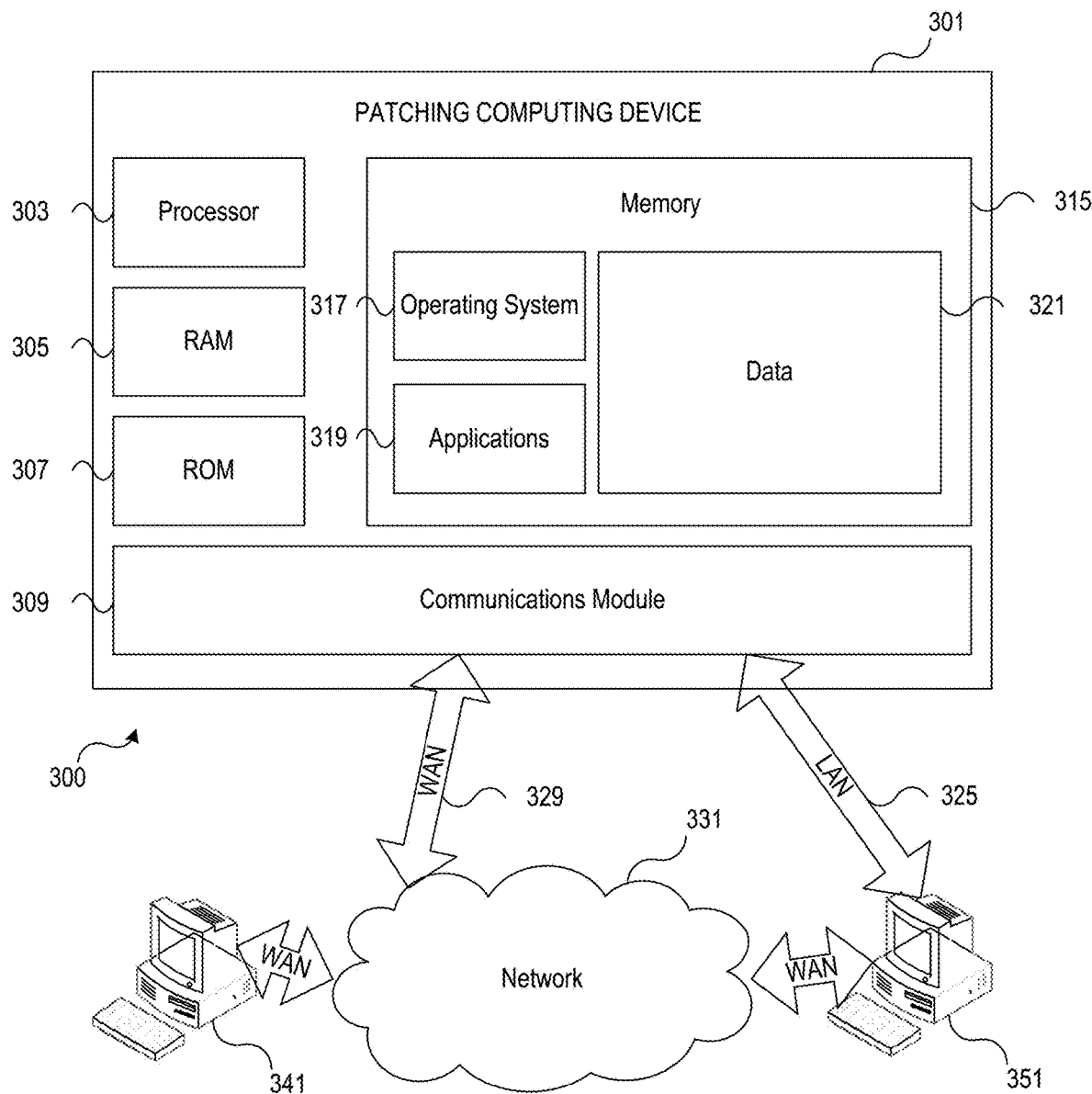
FIG. 3 shows an illustrative operating environment in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative patching computing device 301 having a processor 303 for controlling overall operation of the patching computing device 301 and its associated components, including a Random Access Memory (RAM) 305, a Read-Only Memory (ROM) 307, a communications module 309, and a memory 315. The patching computing device 301 may include a variety of computer readable media. Computer readable media may be any available media that may be accessed by the patching computing device 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the patching computing device 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments of the enterprise computing system 110 is contemplated. For example, aspects of method steps disclosed herein may be executed by the processor 303 of the patching computing device 301, with the patching computing device 301 equivalent to the one or more computing devices 111 and/or servers 150 of FIG. 1. Such a processor may execute computer-executable instructions stored on a computer-readable medium.

Software may be stored within the memory 315 and/or other digital storage to provide instructions to the processor 303 for enabling the patching computing device 301 to perform various functions as discussed herein. For example, the memory 315 may store software used by the patching computing device 301, such as an operating system 317, one or more application programs 319, and/or an associated database 321. In addition, some or all of the computer executable instructions for the patching computing device 301 may be embodied in hardware or firmware. Although not shown, the RAM 305 may include one or more applications representing the application data stored in the RAM 305 while the patching computing device 301 is on and corresponding software applications (e.g., software tasks) are running on the patching computing device 301.

The communications module 309 may include a microphone, a keypad, a touch screen, and/or a stylus through which a user of the patching computing device 301 may provide input, and may include one or more of a speaker for providing audio output and a video display device for providing textual, audiovisual and/or graphical output. The computing system environment 300 may also include optical scanners (not shown).

The patching computing device 301 may operate in a networked environment supporting connections to one or more remote computing devices, such as the computing devices 341 and 351. The computing devices 341 and 351 may be personal computing devices or servers that include any or all of the elements described above relative to the patching computing device 301.

The network connections depicted in FIG. 3 may include a Local Area Network (LAN) 325 and/or a Wide Area Network (WAN) 329, as well as other networks. When used in a LAN networking environment, the patching computing device 301 may be connected to the LAN 325 through a network interface or adapter in the communications module 309. When used in a WAN networking environment, the patching computing device 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
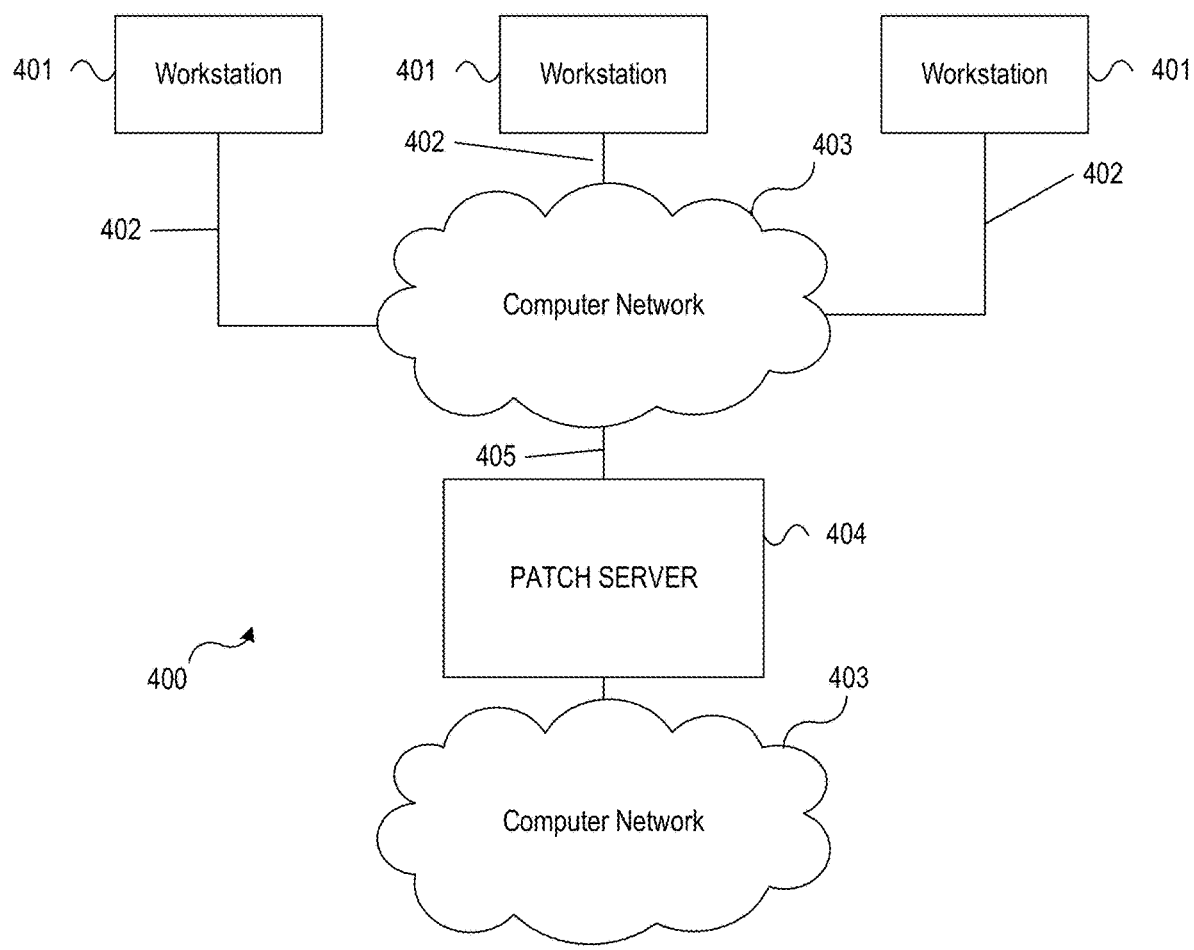
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein for the enterprise computing system 110. The workstations 401 may be local or remote, and may be connected by one of the communications links 402 to a computer network 403 that is linked via the communications link 405 to the patch server 404. In the system 400, the patch server 404 may be a server, processor, computer, or data processing device, or combination of the same, configured to perform the functions and/or processes described herein. For example, the patch server 404 may be equivalent to the one or more computing devices 111 and/or servers 150 of FIG. 1. The patch server 404 may be used to receive check images and associated data and/or validation scores, retrieve user profile, evaluate the check image compared to the user profile, identify matching or non-matching elements, generate user interfaces, and the like.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the patch server 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform comprising:
a processor; and
memory storing computer-readable instructions that, when executed by the processor, cause the computing platform to:
identify a vulnerability associated with a server;
schedule, based on analysis of a knowledge base by a machine learning module, a time interval associated with the server, wherein the time interval comprises an outage period for the server and a tracking module identifies existing time interval information associated with the server;
generate, automatically and by a patch generator, a patch job comprising an update for server software, wherein the patch job specifies that sub-processes of the patch job occur in a specific sequence;
validate, after deployment of the patch job during the time interval and continuously during execution of the patch job, that the sub-processes are ordered correctly;
update, based on an indication that the sub-processes are ordered incorrectly, a sub-process sequence of the patch job;
analyze, by the machine learning module, an assessment report associated with an executed patch job; and
update the knowledge base of the machine learning module based on the analysis of the assessment report associated with the executed patch job.

2. The computing platform of claim 1, wherein the instructions, further cause the computing platform to:
predict, based on the knowledge base of the machine learning module and analysis the vulnerability, the patch job.

3. The computing platform of claim 1, wherein the instructions further cause the computing platform to:
analyze, by the machine learning module, system information associated with the server, wherein the system information comprises usage information for content associated with the server, a geographic location of the server, a reserved maintenance window associated with the server, and an identifier associated with a classification of the server.

4. The computing platform of claim 1, wherein the instructions further cause the computing platform to:
communicate, via a network and based on scheduling the time interval associated with the server, a notification to a plurality of individuals associated with the server, wherein the notification comprises information associated with the time interval.

5. The computing platform of claim 1, wherein the instructions further cause the computing platform to:
generate, by the machine learning module and based on the vulnerability, a patch job configuration file for use in generating the patch job for the vulnerability associated with the server.

6. The computing platform of claim 1, wherein the instructions further cause the computing platform to:
validate, based on the knowledge base of the machine learning module and the tracking module, execution of the patch job, wherein an unsuccessful patch job corresponds to continued exposure to the vulnerability;
identify an error associated with the unsuccessful patch job;
predict a solution for the error; and
add associated information of the error and the predicted solution to the knowledge base.

7. The computing platform of claim 1, wherein the instructions further cause the computing platform to:
generate, based on expiration of the time interval and based on completion of the executed patch job, the assessment report associated with the executed patch job.

8. The computing platform of claim 1, wherein the instructions further cause the computing platform to:
   assign, by the machine learning module and at the tracking module, responsibility for the vulnerability to a plurality of individuals associated with the server; and
   communicate, via a network, a notification to a plurality of individuals associated with the server, wherein the notification comprises information associated with the responsibility for the vulnerability.

9. Non-transitory computer-readable media storing instructions that, when executed by a computing platform comprising a processor, cause the computing platform to:
   identify, based on a machine learning module knowledge base and analysis of a plurality of servers, a vulnerability associated with a server of the plurality of servers;
   schedule, based on analysis by a machine learning module, a time interval associated with the server, wherein the time interval comprises an outage period for the server;
   process, by a tracking module, information for time intervals associated with the plurality of servers;
   generate, automatically and by a patch generator, a patch job comprising a sequence of a series of sub-processes to update software running on the server;
   deploy, to the server, the patch job;
   validate, after deployment of the patch job to the server and continuously during execution of the patch job, that the sub-processes are ordered correctly;
   update, based on an indication that the sub-processes are ordered incorrectly, the sequence of the series of sub-processes;
   analyze, by the machine learning module, an assessment report associated with an executed patch job; and
   store, at the machine learning module knowledge base, results of the analysis of the assessment report associated with the executed patch job.

10. The non-transitory computer-readable media of claim 9, wherein the instructions further cause the computing platform to:
    predict, based on the machine learning module knowledge base and analysis of the vulnerability, the patch job.

11. The non-transitory computer-readable media of claim 9, wherein the instructions further cause the computing platform to:
    analyze, by the machine learning module, system information associated with a server, wherein the system information comprises usage information for content associated with the server, a geographic location of the server, a reserved maintenance window associated with the server, and an identifier associated with a classification of the server.

12. The non-transitory computer-readable media of claim 9, wherein the instructions further cause the computing platform to:
    communicate, via a network and based on scheduling the time interval associated with a server, a notification to a plurality of individuals associated with the server, wherein the notification comprises information associated with the time interval.

13. The non-transitory computer-readable media of claim 9, wherein the instructions further cause the computing platform to:
    generate, by the machine learning module and based on the vulnerability, a configuration file for use in generating the patch job for the vulnerability associated with a server; and
    cause, based on the configuration file, execution of the patch job.

14. The non-transitory computer-readable media of claim 9, wherein the instructions further cause the computing platform to:
    cause, based on a configuration file, execution of the patch job; and
    validate, based on the machine learning module knowledge base and the tracking module, execution of the patch job.

15. The non-transitory computer-readable media of claim 9, wherein the instructions further cause the computing platform to:
    generating, based on expiration of the time interval, the assessment report associated with the executed patch job.

16. The non-transitory computer-readable media of claim 9, wherein the instructions further cause the computing platform to:
    assign, by the machine learning module and at the tracking module, responsibility for the vulnerability to a plurality of individuals associated with a server; and
    communicate, via a network, a notification to a plurality of individuals associated with the server, wherein the notification comprises information associated with the responsibility for the vulnerability.

17. A method, comprising:
    identifying, based on analysis of a plurality of servers, a vulnerability associated with a server of the plurality of servers;
    scheduling, based on analysis of a knowledge base by a machine learning module, a time interval associated with the server, wherein the time interval comprises an outage period for the server;
    identifying, by a tracking module existing time intervals associated with the plurality of servers;
    generating, automatically and by a patch generator, a patch job comprising a sequence of a series of sub-processes to update software running on the server, wherein the patch job specifies that sub-processes of the patch job occur in a specific sequence to resolve the vulnerability;
    validating, continuously during execution of the patch job, that the sub-processes are ordered correctly;
    updating, based on an indication that the sub-processes are ordered incorrectly, the sequence of series of the sub-processes;
    analyzing, by the machine learning module, an assessment report associated with an executed patch job; and
    updating the knowledge base of the machine learning module based on the analysis of the assessment report associated with the executed patch job.

18. The method of claim 17, comprising:
    generating, by the machine learning module and based on the vulnerability, a configuration file for use in generating the patch job for the vulnerability associated with a server; and
    deploying the patch job to the server, wherein execution of the patch job is based on the configuration file.

19. The method of claim 17, comprising:
    validating, based on the knowledge base of the machine learning module, execution of the patch job, wherein execution of the patch job is based on a configuration file.

20. The method of claim 17, comprising:
validating, based on the knowledge base of the machine learning module, execution of the patch job, wherein execution of the patch job is based on a configuration file; and
generating, based on expiration of the time interval and based on completion of the executed patch job, the assessment report associated with the executed patch job.

\* \* \* \* \*